United States Patent
Tanaka

(10) Patent No.: US 7,919,886 B2
(45) Date of Patent: Apr. 5, 2011

(54) POWER RECEIVING DEVICE AND POWER TRANSFER SYSTEM

(75) Inventor: Katsuyuki Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 277 days.

(21) Appl. No.: 12/201,719

(22) Filed: Aug. 29, 2008

(65) Prior Publication Data

US 2009/0058190 A1    Mar. 5, 2009

(30) Foreign Application Priority Data

Aug. 31, 2007    (JP) ................ P2007-226572

(51) Int. Cl.
*H01F 27/42*    (2006.01)
(52) U.S. Cl. .................................................. 307/104
(58) Field of Classification Search ............ 307/24, 307/104; 235/492
See application file for complete search history.

(56) References Cited

U.S. PATENT DOCUMENTS

| | | | |
|---|---|---|---|
| 5,084,699 A * | 1/1992 | DeMichele | 340/10.34 |
| 6,321,067 B1 | 11/2001 | Suga et al. | |
| 2007/0246546 A1 * | 10/2007 | Yoshida | 235/492 |

FOREIGN PATENT DOCUMENTS

| | | |
|---|---|---|
| JP | 10-145987 | 5/1998 |
| JP | 11-298368 | 10/1999 |
| JP | 2001-238372 | 8/2001 |
| JP | 2002-64403 | 2/2002 |
| JP | 2007288718 | * 11/2007 |

OTHER PUBLICATIONS

"HAM Journal No. 98, 1995, 7/8" CQ Publishing Co., LTD. 1995, p. 47, Abstract.
English language translation of Notification of First Office Action issued by Patent Office of the People's Republic of China on May 20, 2010 in corresponding Chinese Application No. 200810213930.X.

* cited by examiner

*Primary Examiner* — Michael Rutland Wallis
(74) *Attorney, Agent, or Firm* — Finnegan, Henderson, Farabow, Garrett & Dunner, L.L.P.

(57) ABSTRACT

There is provided a power receiving device capable of receiving a carrier wave transmitted from a power transmitting device without contact and obtaining electric power from the received carrier wave, which includes a carrier receiving section at least including a communication antenna having predetermined inductance and not equipped with an intermediate tap, to receive the carrier wave and generate an induced voltage corresponding to the carrier wave, a processing section to generate a drive voltage based on the induced voltage and perform data processing using the generated drive voltage, and an impedance converting section to convert impedance between the carrier receiving section and the processing section.

4 Claims, 13 Drawing Sheets

000# POWER RECEIVING DEVICE AND POWER TRANSFER SYSTEM

CROSS REFERENCES TO RELATED APPLICATIONS

The present invention contains subject matter related to Japanese Patent Application JP 2007-226572 filed in the Japan Patent Office on Aug. 31, 2007, the entire contents of which being incorporated herein by reference.

BACKGROUND OF THE INVENTION

1. Field of the Invention

The present invention relates to a power receiving device and a power transfer system.

2. Description of the Related Art

Information processing devices capable of communicating without contact with a reader/writer (or an information processing device having a reader/writer function), such as a non-contact integrated circuit (IC) card, a radio frequency identification (RFID) tag and a cellular phone equipped with a non-contact IC chip, have come into widespread use.

A reader/writer and an information processing device such as an IC card or a cellular phone communicate with each other by using a magnetic field at a specific frequency such as 13.56 MHz as a carrier wave. Specifically, a reader/writer and an information processing device communicate in such a way that the reader/writer transmits a carrier wave on which a carrier signal is superimposed, and the information processing device such as an IC card receives the carrier wave with an antenna and returns a response signal to the received carrier signal by load modulation.

Further, an information processing device such as an IC card or a cellular phone is driven by a voltage (induced voltage) which is generated according to a magnetic flux when a magnetic field generated by a reader/writer passes through a communication antenna as a power supply. Thus, a reader/writer can supply electric power wirelessly to an information processing device such as an IC card or a cellular phone by transmitting a carrier wave.

A technique of increasing efficiency of wireless transfer of electric power using a carrier wave by performing impedance conversion has been developed. The technique of increasing reception efficiency of an electric wave by means of impedance conversion is disclosed in "HAM Journal No. 98, 1995.7/8" CQ Publishing Co., Ltd. 1995, p. 47.

SUMMARY OF THE INVENTION

According to the technique of enhancing efficiency of wireless transfer of electric power using a carrier wave by performing impedance conversion, a power receiving device, which is a device to receive a power supply, includes a resonance circuit that is set to resonate at a specific frequency by connecting a resonance capacitor to a coil or a loop antenna (communication antenna) for receiving a carrier wave and performs impedance conversion directly through an intermediate tap from the coil or the loop antenna or by separately placing a coupling coil. However, because the size of a coil or a loop antenna is generally larger than the size of a resonance capacitor, leads of an intermediate tap or placement of a coupling coil may constitute a restriction on packaging. Further, because an impedance conversion ratio is fixed in impedance conversion using an intermediate tap or a coupling coil, impedance matching can be performed only in particular cases.

In light of the foregoing, it is desirable to provide a novel and improved power receiving device and a power transfer system capable of increasing efficiency of wireless transfer of electric power without placing an intermediate tap in a communication antenna for receiving a carrier wave.

According to an embodiment of the present invention, there is provided a power receiving device capable of receiving a carrier wave transmitted from a power transmitting device without contact and obtaining electric power from the received carrier wave, which includes a carrier receiving section at least including a communication antenna having predetermined inductance and not equipped with an intermediate tap, to receive the carrier wave and generate an induced voltage corresponding to the carrier wave, a processing section to generate a drive voltage based on the induced voltage and perform data processing using the generated drive voltage, and an impedance converting section to convert impedance between the carrier receiving section and the processing section.

The above power receiving device includes the carrier receiving section, the processing section and the impedance converting section. The carrier receiving section receives a carrier wave which is transmitted from the power transmitting device without contact and generates an induced voltage corresponding to the carrier wave. The carrier receiving section includes a communication antenna having predetermined inductance and not equipped with an intermediate tap. The processing section generates a drive voltage based on the induced voltage which is generated in the carrier receiving section and performs data processing using the generated drive voltage. The impedance converting section converts impedance between the carrier receiving section and the processing section. In this configuration, it is possible to increase efficiency of wireless transfer of electric power without placing an intermediate tap in the communication antenna to receive a carrier wave.

The impedance converting section may include a first capacitor and a second capacitor each having predetermined capacitance and connected in series with each other, the communication antenna, the first capacitor and the second capacitor may constitute a resonance circuit, and the impedance converting section may divide an induced voltage generated in the resonance circuit.

In this configuration, it is possible to increase efficiency of wireless transfer of electric power without placing an intermediate tap in the communication antenna to receive a carrier wave.

The carrier receiving section may further include a third capacitor having predetermined capacitance to constitute a resonance circuit, and the impedance converting section may include a transformer.

In this configuration, it is possible to increase efficiency of wireless transfer of electric power without placing an intermediate tap in the communication antenna to receive a carrier wave.

The carrier receiving section may further include a fourth capacitor having predetermined capacitance to constitute a resonance circuit, and the impedance converting section may include an inductor having predetermined inductance and connected in series with the processing section and divide an induced voltage generated in the resonance circuit.

In this configuration, it is possible to increase efficiency of wireless transfer of electric power without placing an intermediate tap in the communication antenna to receive a carrier wave.

The carrier receiving section may further include a fifth capacitor having predetermined capacitance to constitute a resonance circuit, and the impedance converting section may include a sixth capacitor having predetermined capacitance and connected in series with the processing section and divide an induced voltage generated in the resonance circuit.

In this configuration, it is possible to increase efficiency of wireless transfer of electric power without placing an intermediate tap in the communication antenna to receive a carrier wave.

The impedance converting section may match output impedance of the carrier receiving section and input impedance of the processing section.

In this configuration, it is possible to further increase efficiency of wireless transfer of electric power.

According to another embodiment of the present invention, there is provided a power transfer system including a power transmitting device to transmit a carrier wave, and a power receiving device capable of receiving the carrier wave transmitted from the power transmitting device without contact and obtaining electric power from the received carrier wave, in which the power transmitting device includes a carrier signal generating section to generate a carrier signal, and a carrier transmitting section to transmit a carrier wave corresponding to the carrier signal, and the power receiving device includes a carrier receiving section at least including a communication antenna having predetermined inductance and not equipped with an intermediate tap, to receive the carrier wave and generate an induced voltage corresponding to the carrier wave, a processing section to generate a drive voltage based on the induced voltage and perform data processing using the generated drive voltage, and an impedance converting section to convert impedance between the carrier receiving section and the processing section.

In this configuration, there is achieved the power transfer system in which the power transmitting device transmits a carrier wave and thereby transfers electric power, and the power receiving device to receive the carrier wave has a communication antenna to receive the carrier wave which is not equipped with an intermediate tap, thereby increasing efficiency of wireless transfer of electric power.

According to the embodiments of the present invention described above, it is possible to increase efficiency of wireless transfer of electric power without placing an intermediate tap in a communication antenna for receiving a carrier wave.

DETAILED DESCRIPTION OF THE PREFERRED EMBODIMENTS

Figure 1:
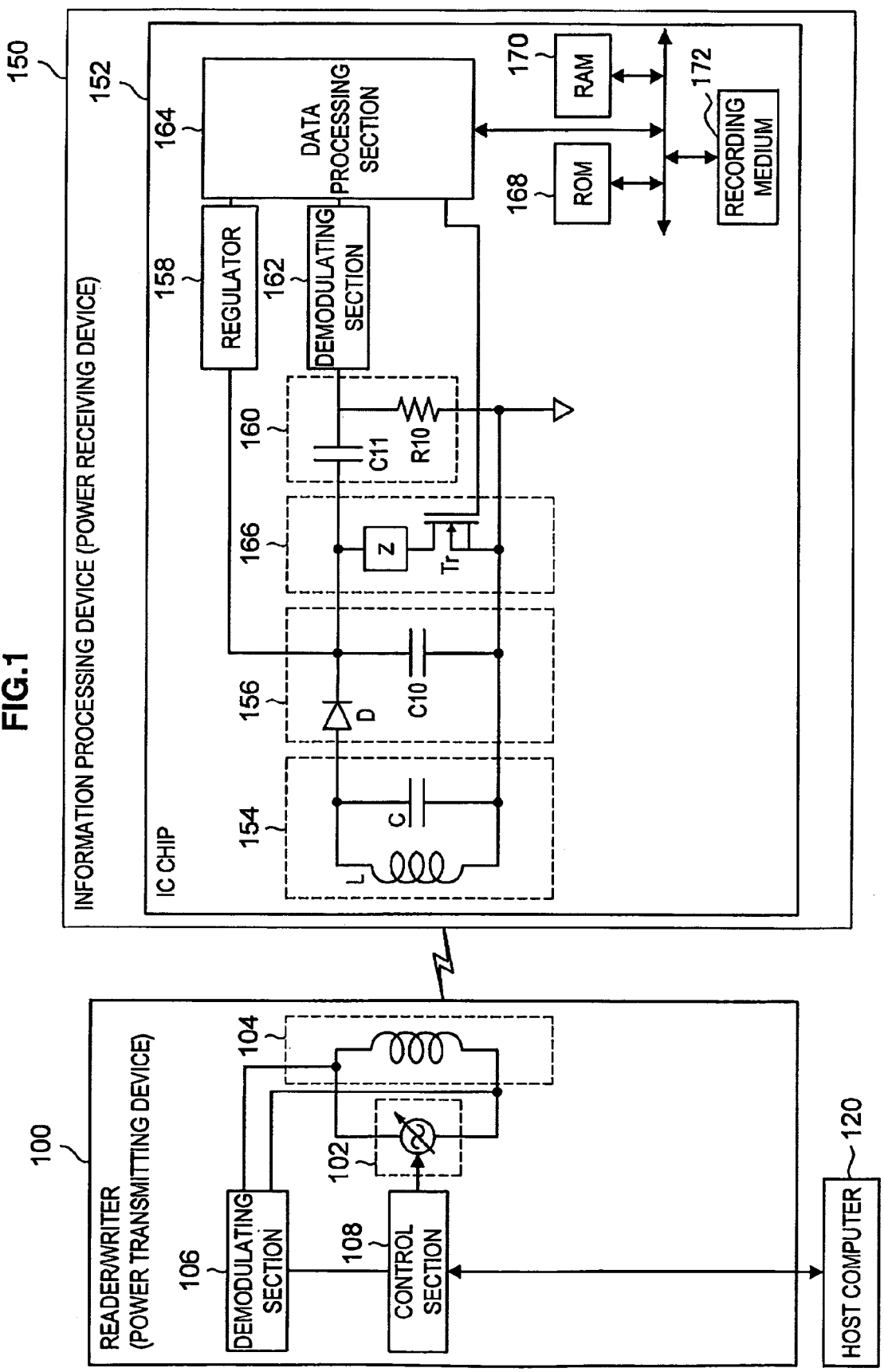
FIG. 1 is an explanatory view showing the overview of a power transfer system according to an embodiment of the present invention.

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted.

(Overview of the Power Transfer System)

Prior to describing a power receiving device according to embodiments of the present invention, the overview of a power transfer system according to embodiments of the present invention is described hereinafter. FIG. 1 is an explanatory view showing the overview of a power transfer system according to embodiments of the present invention.

Referring to FIG. 1, the power transfer system according to embodiments of the present invention includes a reader/writer 100 which serves as a power transmitting device that transmits a carrier wave and supplies electric power and an information processing device 150 which serves as a power receiving device that receives a carrier wave and obtains electric power form the carrier wave. Although a medium through which a power transmitting device (reader/writer) supplies electric power, which is a carrier wave, is a magnetic field at a specific frequency in the following description by way of illustration, a carrier wave in the power transfer system according to embodiments of the present invention is not limited thereto, and it may be an electric field, for example. In such a case, a flat plate capacitor, rather than a coil, serves as a communication antenna, for example. The configuration of the information processing device 150 shown in FIG. 1 is an example for illustrating the overview of the power transfer system, and the configuration of the power receiving device according to embodiments of the present invention is described later.

[Reader/Writer 100 (Power Transmitting Device)]

The reader/writer 100 may include a carrier signal generating section 102, a carrier transmitting section 104, a demodulating section 106 and a control section 108. The reader/writer 100 is connected to a host computer 120 and transmits a carrier signal in response to a transmission command from the host computer 120, for example.

The reader/writer 100 may further include read only memory (ROM; not shown) that stores a program and control data such as a processing parameter to be used by the control section 108, random access memory (RAM; not shown) to temporarily store a program to be executed by the control section 108, a register (not shown) to store processing result and execution state in the control section 108, an encryption circuit (not shown) to encrypt communication, a storage section (not shown) to store application, data or the like to be used by the reader/writer 100, an interface (not shown) to make connection with the host computer 120 or another circuit, and so on. The elements of the reader/writer 100 may be connected by a bus, which is a data transmission line. A storage section (not shown) may be a magnetic storage medium such as a hard disk or nonvolatile memory such as flash memory, for example, although not limited thereto. An interface may be a universal asynchronous receiver transmitter (UART) or a network terminal, for example, although not limited thereto.

The carrier signal generating section 102 receives a carrier signal generation command from the control section 108 and generates a carrier signal according to the carrier signal generation command. Although an alternating-current power supply is illustrated as the carrier signal generating section 102 in FIG. 1, the carrier signal generating section 102 according to embodiments of the present invention is not limited thereto, and it may be composed of a modulator (not shown) that performs perform ASK modulation and an amplifier (not shown) that amplifies an output of the modulator, for example. A carrier signal which is generated by the carrier signal generating section 102 may contain various kinds of processing commands and data to be processed for the information processing device 150, though not limited thereto. For example, a carrier signal according to embodiments of the present invention may be a signal that causes the carrier transmitting section 104 to generate a carrier wave for performing power supply to the information processing device 150.

The carrier transmitting section 104 includes a coil (inductor) having predetermined inductance and transmits a carrier wave according to a carrier signal which is generated by the carrier signal generating section 102. Further, the carrier transmitting section 104 can receive a response signal from the information processing device 150. Thus, the carrier transmitting section 104 can serve as a communication antenna of the reader/writer 100. Although the carrier transmitting section 104 is formed by a coil in the example of FIG. 1, the carrier transmitting section 104 according to embodiments of the present invention is not limited thereto, and it may further include a capacitor to constitute a resonance circuit, for example.

The demodulating section 106 performs envelope detection of an amplitude change in a voltage at an antenna end of the carrier transmitting section 104 and converts a detected signal into a binary code, thereby demodulating a response signal from the information processing device 150, for example. A method of demodulating a response signal in the demodulating section 106, however, is not limited thereto. For example, a response signal may be demodulated using a phase change in a voltage at an antenna end of the carrier transmitting section 104.

The control section 108 is formed by a micro processing unit (MPU) or the like, for example, and performs various processing such as transmission of data that is demodulated by the demodulating section 106 to the host computer 120 and generation of a carrier signal generation command based on data that is demodulated by the demodulating section 106.

The reader/writer 100 has the above-described configuration, for example, thereby transmitting a carrier wave.

[Information Processing Device 150 (Power Receiving Device)]

The information processing device 150 includes an IC chip 152 which is capable of receiving a carrier wave and transmitting a response signal by load modulation. The information processing device 150 may further include a control section (not shown) that is formed by MPU or the like and controls the information processing device 150 as a whole, a storage section (not shown) to store application, data or the like to be used in the information processing device 150, and so on. A storage section (not shown) may be a magnetic storage medium such as a hard disk or nonvolatile memory such as flash memory, for example, although not limited thereto.

(Configuration of the IC Chip 152)

The IC chip 152 includes a communication antenna 154, a detecting section 156, a regulator 158, a filter section 160, a demodulating section 162, a data processing section 164, and a load modulating section 166. Further, the IC chip 152 may include ROM 168 that stores a program and control data such as a processing parameter to be used by the data processing section 164, RAM 170 to temporarily store a program to be executed by the data processing section 164, processing result, execution state and so on, a storage section 172 to store data to be used by the data processing section 164, and so on. The data processing section 164, the ROM 168, the RAM 170 and the storage section 172 may be connected by a bus, which is a data transmission line. The storage section 172 may be nonvolatile memory such as electrically erasable and programmable read only memory (EEPROM), flash memory, magnetoresistive random access memory (MRAM), ferroelectric random access memory (FeRAM), or phase change random access memory (PRAM), for example, although not limited thereto.

The communication antenna 154 is formed by a resonance circuit that is composed of a coil (inductor) L having predetermined inductance and a capacitor C having predetermined capacitance, and it generates an induced voltage by electromagnetic induction according to reception of a carrier wave. The communication antenna 154 then outputs a received voltage by resonating the induced voltage at a predetermined resonance frequency. The resonance frequency in the communication antenna 154 may be set in accordance with the frequency of a carrier wave such as 13.56 MHz, for example. In this configuration, the communication antenna 154 can receive a carrier wave and transmit a response signal obtained by load modulation which is performed in the load modulating section 166.

The detecting section 156 rectifies the received voltage which is output from the communication antenna 154. The detecting section 156 may be composed of a diode D and a capacitor C10, although not limited thereto.

The regulator 158 smoothes the received voltage into a constant voltage and outputs a drive voltage to the data processing section 164. The regulator 158 may use a direct-current component of the received voltage as a drive voltage.

The filter section 160 may be formed by a high-pass filter that is composed of a capacitor C11 and a resistor R10, for example, and performs filtering of the received voltage.

The demodulating section 162 performs demodulation using the received voltage that is output from the filter section 160 and acquires data corresponding to the carrier signal which is contained in the carrier wave. The demodulating section 162 can acquire an alternating-current component of the received voltage as data.

The data processing section 164 processes data which is demodulated by the demodulating section 162 using the drive voltage that is output from the regulator 158 as a power supply. The data processing section 164 may be formed by MPU, for example.

The load modulating section 166 includes a load Z and a transistor Tr, for example, and it can perform load modulation according to a processing result in the data processing section 164. As a result of the load modulation in the load modulating section 166, a change occurs in impedance of the information processing device 150 when viewed from the reader/writer 100. The reader/writer 100 detects the change in impedance by using an amplitude change in a voltage at an antenna end of the carrier transmitting section 104, for example, thereby receiving a response signal which is transmitted from the information processing device 150 to the reader/writer 100.

The information processing device 150 has the above-described configuration, for example, thereby obtaining electric power from a carrier wave which is transmitted from the reader/writer 100 and performing data processing or the like.

(Issue of Power Transfer Efficiency in the Power Transfer System)

As described in the foregoing, the information processing device 150 (power receiving device) which constitutes the power transfer system can be driven by obtaining electric power from a carrier wave that is transmitted from the reader/writer 100 (power transmitting device). An issue of transfer efficiency of electric power in the power transfer system is described hereinafter.

Figure 2:
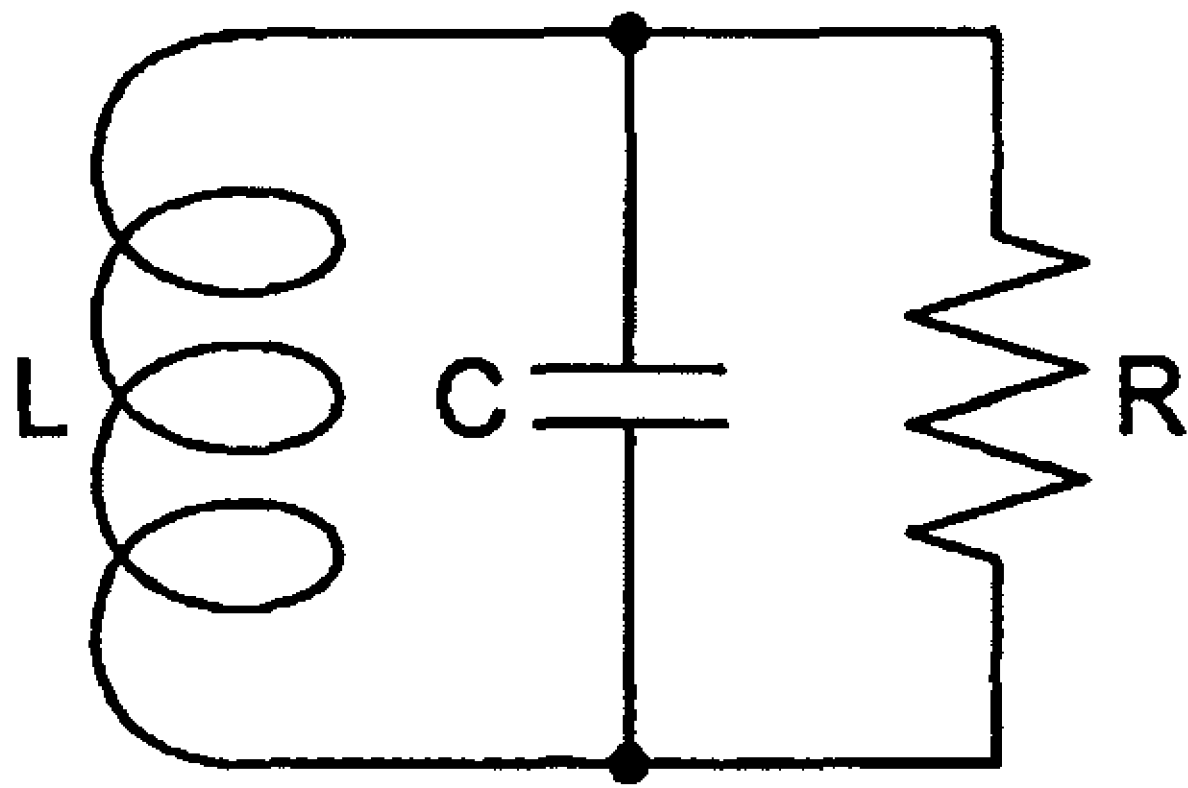
FIG. 2 is an explanatory view showing an equivalent circuit of a communication antenna portion of an IC chip shown in FIG. 1.
Figure 3A:
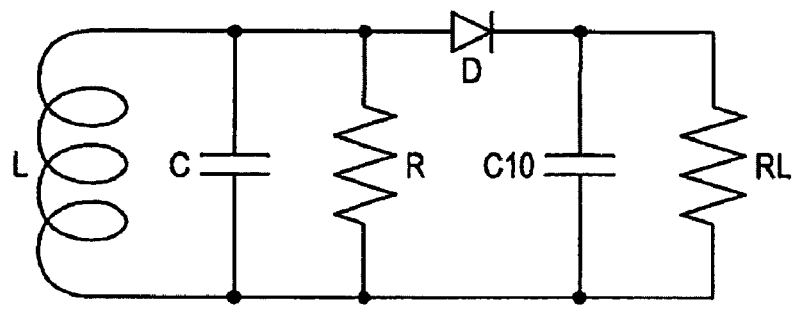
FIG. 3A is an explanatory view showing an equivalent circuit of the IC chip shown in FIG. 1.
Figure 3B:
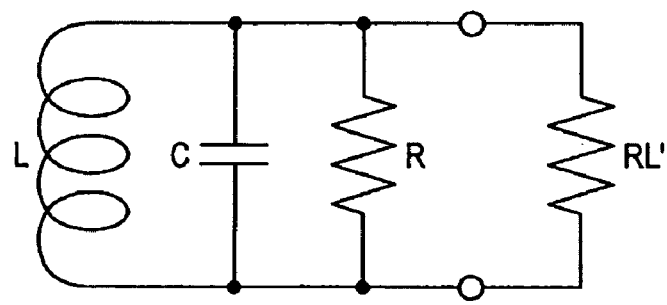
FIG. 3B is an explanatory view showing an equivalent circuit of the IC chip shown in FIG. 1.
Figure 3C:
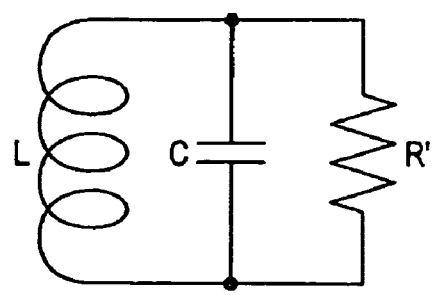
FIG. 3C is an explanatory view showing an equivalent circuit of the IC chip shown in FIG. 1.

FIG. 2 is an explanatory view showing an equivalent circuit of the communication antenna 154 portion of the IC chip 152 shown in FIG. 1. FIGS. 3A to 3C are explanatory views showing equivalent circuits of the IC chip 152 shown in FIG. 1.

(1) Equivalent Circuit of a Resonance Circuit (Communication Antenna 154) Portion FIG. 2 shows an equivalent circuit of the communication antenna 154 portion, which is a resonance circuit. A resistor R in FIG. 2 is an equivalent parallel resistor which is formed by a conductor, a coil L and so on. If the coil L is a loop coil having an area S, electric power which is consumed in the equivalent parallel resistor R can be expressed by the following expression 1. In the expression 1, V is an open end voltage of a loop coil, ω=2πf (f is a frequency of a carrier wave), μ0 is a magnetic permeability in vacuum, Ho is a strength of a magnetic field, n is the number of turns of a loop coil, L is inductance of a loop coil, and Q=R/ωL.

$$P = \frac{|V|^2}{R} \qquad \text{Expression 1}$$
$$= \frac{|(j\omega\mu_o \cdot H_o \cdot S \cdot n \cdot Q)|^2}{R}$$
$$= \omega(\mu_o \cdot H_o \cdot S \cdot n)^2 \cdot \frac{Q}{L}$$

In an ideal winding coil, inductance L is proportional to the square of the number of turns. Thus, electric power P which is consumed in the communication antenna 154 portion does not depend on the number of turns of a loop coil, and it is determined by the frequency f of a carrier wave, the strength H of a magnetic field, or a physical shape of a loop coil, and it is proportional to Q of the communication antenna 154. Accordingly, as Q of the communication antenna 154 is higher, that is, as resistance of the equivalent parallel resistor R is higher, electric power P which is consumed in the communication antenna 154 is larger.

(2) Equivalent Circuit of an Entire Power Receiving Side (IC Chip 152)

FIG. 3A is an equivalent circuit which represents the elements in stages subsequent to the detecting section 156 by an equivalent parallel resistor RL, and FIG. 3B is an equivalent circuit which represents the detecting section 156 and the equivalent parallel resistor RL by an equivalent parallel resistor RL'. FIG. 3C is an equivalent circuit which represents the equivalent parallel resistor R and the equivalent parallel resistor RL' by an equivalent parallel resistor R'.

If the IC chip 152, which is, the power receiving side as a whole is viewed as a single resonance circuit as shown in FIG. 3C, electric power P which is consumed in the entire power receiving side (IC chip 152) becomes larger as Q of the entire power receiving side is higher, that is, as resistance of the equivalent parallel resistor R' is higher as expressed in the expression 1.

Further, in the IC chip 152, various data processing is performed in the data processing section 164, for example, as described earlier. Thus, if larger electric power can be consumed in the equivalent parallel resistor RL' of FIG. 3B, or even the equivalent parallel resistor RL of FIG. 3A, the power transfer system can increase transfer efficiency of electric power.

However, as the circuit of the power receiving side (the IC chip 152 in the information processing device 150) becomes more sophisticated and performs processing at a higher speed, a load becomes heavier, so that the relationship between resistance of the equivalent parallel resistor R and resistance of the equivalent parallel resistor RL becomes "RL<<R". Thus, even if Q of the resonance circuit (communication antenna 154) portion can be set higher, it is the equivalent parallel resistor RL shown in FIG. 3A that dominates Q of the entire power receiving side (the IC chip 152).

Accordingly, the information processing device 150 (power receiving device) fails to increase power consumption in the equivalent parallel resistor RL of FIG. 3A, for example, and therefore the power transfer system fails to sufficiently increase transfer efficiency of electric power.

(Approach to Address the Issue in the Power Receiving Device According to Embodiments of the Present Invention)

In order to address the issue of power transfer efficiency in the power transfer system described above, the power receiving device according to embodiments of the present invention performs impedance conversion that converts from high impedance to low impedance between the equivalent parallel resistor R and the equivalent parallel resistor RL' of FIG. 3B, for example. By performing impedance conversion, impedance viewed from the resonance circuit does not decrease in the power receiving device, and Q of the entire power receiving side can be kept high compared with the case where impedance conversion is not performed. The power receiving device can thereby use higher electric power in the equivalent parallel resistor RL' of FIG. 3B, which is the portion to perform various processing, thereby increasing electric power transfer efficiency in the power transfer system.

(Power Receiving Device According to the First Embodiment)

Figure 4:
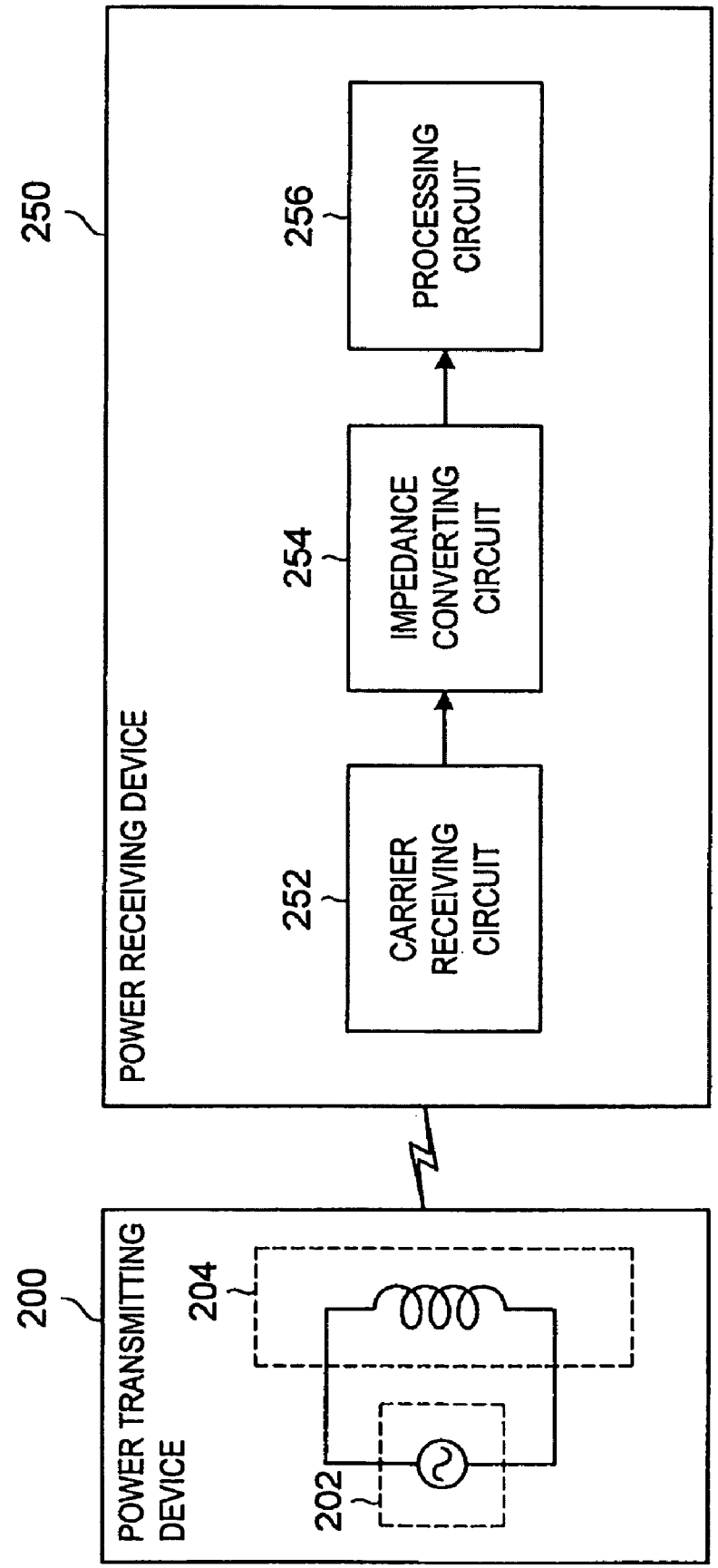
FIG. 4 is a block diagram showing a power receiving device according to a first embodiment of the present invention.

A power receiving device according to a first embodiment of the present invention based on the above-described approach to address the issue is described hereinafter. FIG. 4 is a block diagram showing a power receiving device 250 according to the first embodiment of the present invention.

FIG. 4 also shows a power transmitting device 200 for transmitting a carrier wave according to embodiments of the present invention. The power transmitting device 200 may have the similar configuration to the reader/writer 100 shown in FIG. 1, and it may include a carrier signal generating section 202 and a carrier transmitting section 204, for example. The power transmitting device 200 may further include a control section (not shown) that is formed by MPU or the like, ROM (not shown) that stores control data such as a program and a processing parameter to be used by the control section, RAM (not shown) to temporarily store a program or the like to be executed by the control section, a storage section (not shown) to store application, data or the like to be used in the power transmitting device 200, and so on.

The power receiving device 250 may include a carrier receiving circuit 252 (carrier receiving section), an impedance converting circuit 254 (impedance converting section), and a processing circuit 256 (processing section). Although not shown in FIG. 4, the carrier receiving circuit 252, the impedance converting circuit 254 and the processing circuit 256 according to the first embodiment of the present invention may be implemented by an IC chip.

The carrier receiving circuit 252 receives a carrier wave which is transmitted from the power transmitting device 200 and generates an induced voltage according to the carrier wave. The carrier receiving circuit 252 may at least include a communication antenna which is not equipped with an intermediate tap, and it generates an induced voltage by electromagnetic induction in the communication antenna, for example.

The impedance converting circuit 254 converts impedance between the carrier receiving circuit 252 and the processing circuit 256. The impedance converting circuit 254 can convert impedance between the carrier receiving circuit 252 and the processing circuit 256 from high impedance to low impedance, for example. Further, the impedance converting circuit 254 can match impedance between the carrier receiving circuit 252 and the processing circuit 256.

The processing circuit 256 can generate a drive voltage based on an induced voltage and demodulate a carrier signal which is transmitted from the power transmitting device 200 based on the induced voltage. Further, the processing circuit 256 can perform data processing by using the generated drive voltage as a power supply. The processing circuit 256 may be composed of the detecting section 156, the regulator 158, the filter section 160, the demodulating section 162, the data processing section 164 and the load modulating section 166 shown in FIG. 1, although not limited thereto.

[Configuration Example of the Power Receiving Device 250]

Figure 5:
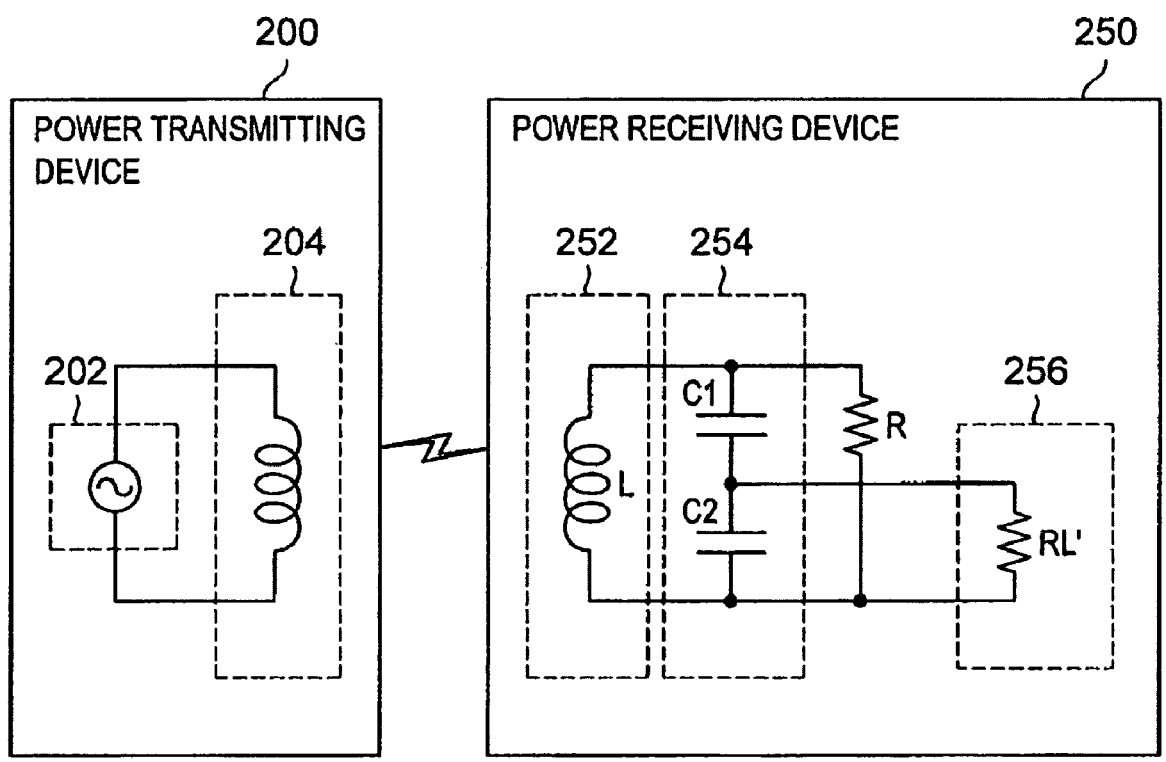
FIG. 5 is an explanatory view showing an equivalent circuit of a configuration example of the power receiving device according to the first embodiment of the present invention.

FIG. 5 is an explanatory view showing an equivalent circuit of a configuration example of the power receiving device 250 according to the first embodiment of the present invention. FIG. 5 also shows the power transmitting device 200 which transmits a carrier wave.

Referring to FIG. 5, the carrier receiving circuit 252, the impedance converting circuit 254 and the processing circuit 256 of the power receiving device 250 respectively have the following configurations.

(Carrier Receiving Circuit 252)

The carrier receiving circuit 252 is formed by an inductor L (communication antenna) having predetermined inductance, which is not equipped with an intermediate tap.

(Impedance Converting Circuit 254)

The impedance converting circuit 254 is composed of capacitors C1 and C2 which are connected in series. The inductor L and the capacitors C1 and C2 constitute a resonance circuit.

(Processing Circuit 256)

The processing circuit 256 corresponds to the equivalent parallel resistor RL' (the same as that of FIG. 3B).

The carrier receiving circuit 252 and the impedance converting circuit 254 constitute a resonance circuit. The impedance converting circuit 254 includes the capacitors C1 and C2 which are connected in series so as to divide a received voltage that is produced by resonating an induced voltage generated by the inductor L in the resonance circuit, thereby performing impedance conversion. For example, if capacitance of the capacitors C1 and C2 is "C1=k/(k−1)*C" and "C2=k*C" (where k>1), respectively, combined capacitance of the capacitors C1 and C2 is C. Accordingly, the received voltage is divided at 1/k times by the capacitors C1 and C2 which are connected in series. The capacitors C1 and C2 may be formed by capacitors having variable capacitance, although not limited thereto.

Figure 6:
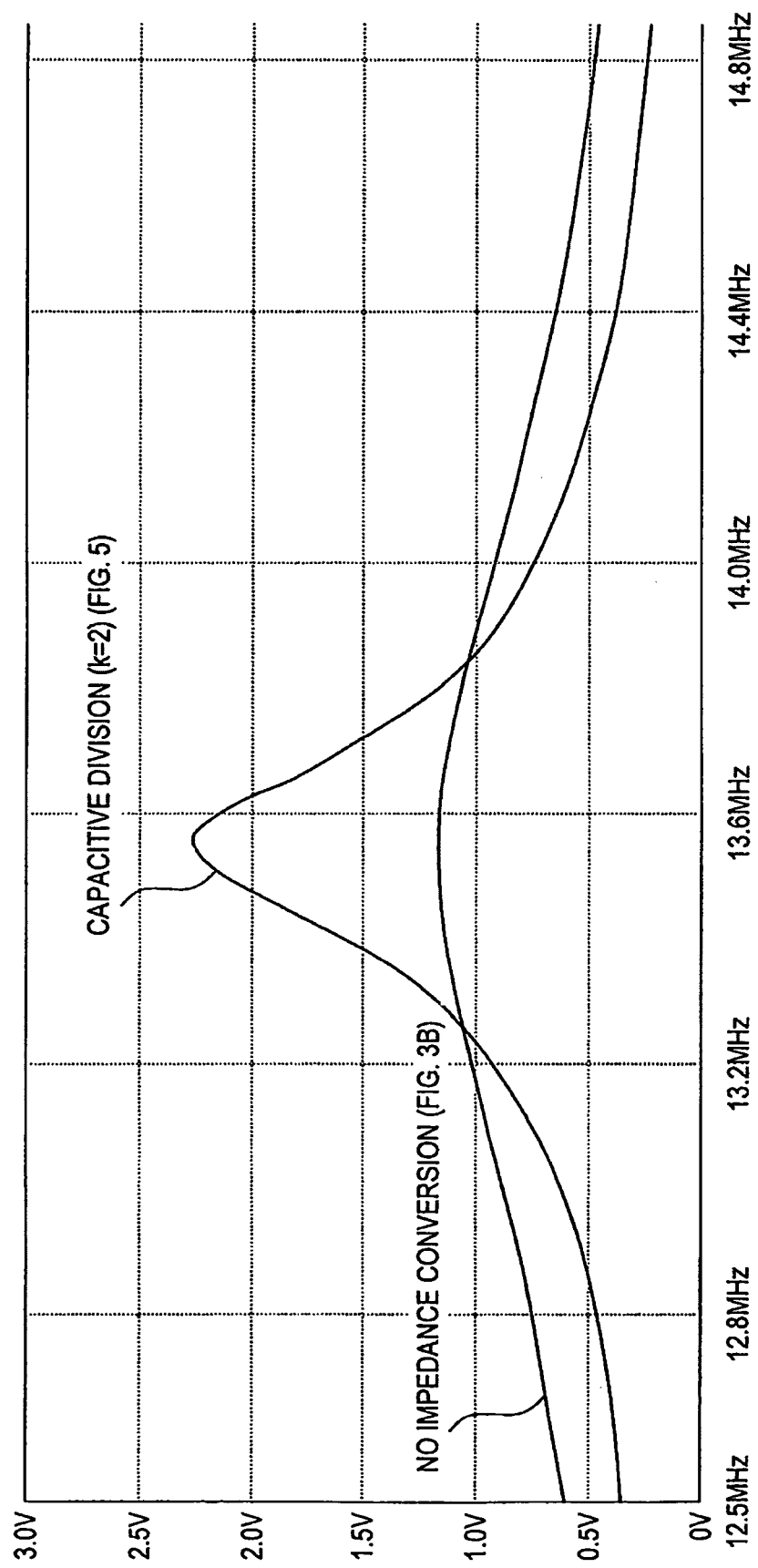
FIG. 6 is an explanatory view showing an example of a voltage generated in an equivalent load resistor RL' in the power receiving device according to the first embodiment of the present invention.

FIG. 6 is an explanatory view showing an example of a voltage which is generated in the equivalent load resistor RL' in the power receiving device 250 according to the first embodiment of the present invention. In FIG. 6, the vertical axis indicates a voltage which is generated in the equivalent load resistor RL' in the case where impedance conversion is not performed (FIG. 3B) and the case where capacitive division at k=2 is performed (FIG. 5), and the horizontal axis indicates a frequency of a carrier wave. FIG. 6 shows the case where the Q-value of the resonance circuit is 1000 and a ratio of the equivalent load resistor R and the equivalent load resistor RL' is 85, for example.

Referring to FIG. 6, in comparison between the case of not performing impedance conversion (FIG. 3B) and the case of performing capacitive division at k=2, a voltage which is generated in the equivalent load resistor RL' becomes larger by performing impedance conversion, although a slight deviation occurs in a resonance frequency. Thus, the power receiving device 250 can consume larger electric power in the equivalent load resistor RL' (processing circuit 256) by performing impedance conversion, so that electric power transfer efficiency in the power transfer system increases compared with the case where impedance conversion is not performed.

Figure 7:
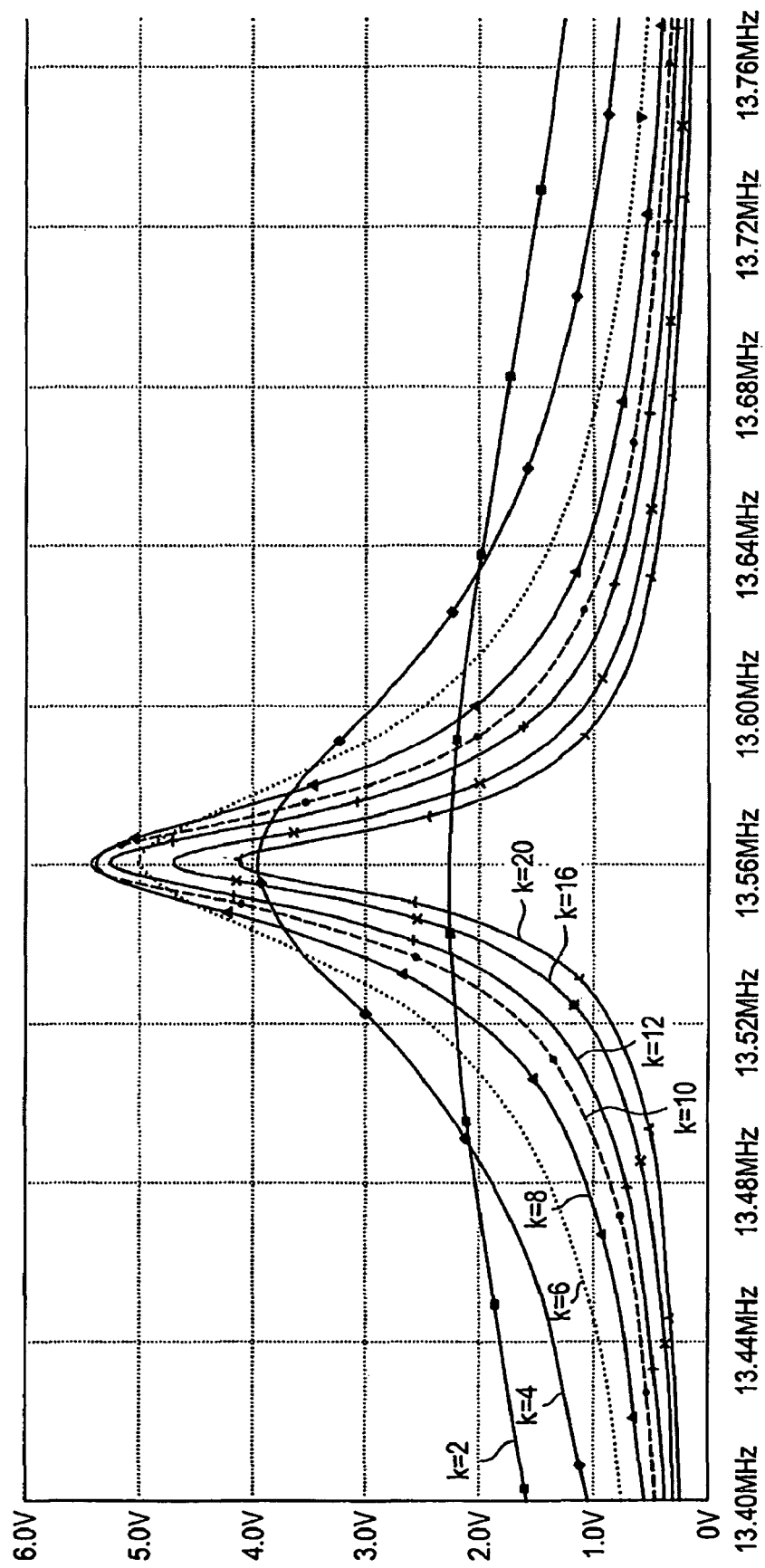
FIG. 7 is an explanatory view showing a voltage generated in the equivalent load resistor RL' when a voltage dividing ratio is varied in the power receiving device according to the first embodiment of the present invention.

FIG. 7 is an explanatory view showing a voltage which is generated in the equivalent load resistor RL' when a voltage dividing ratio is varied in the power receiving device 250 according to the first embodiment of the present invention.

Referring to FIG. 7, a voltage generated in the equivalent load resistor RL' is maximum when k=8 to 10, and if the case of k=8 to 10 is compared with the case of not performing impedance conversion (FIG. 3B) shown in FIG. 6, the voltage generated in the equivalent load resistor RL' is about 4.5 times higher, and electric power transfer efficiency is about 20 times larger. A condition for matching impedance between the carrier receiving circuit 252 and the processing circuit 256 can be approximately expressed by the following expression 2.

$$k^2 = R/RL' \qquad \text{Expression 2}$$

If the conditions of R and RL' which derive the waveform of FIG. 7 are substituted into the expression 2, k≈√(85)=9.2, so that a voltage generated in the equivalent load resistor RL' is maximum when k=8 to 10 as shown in FIG. 7.

If a voltage which is generated in the equivalent load resistor RL' becomes 4.5 times higher, for example, a distance for which power transfer using a carrier wave is possible (hereinafter referred to as an operating distance) in the power transfer system is at least 1.65 (the cube root of 4.5) times longer compared with the case of not performing impedance conversion. Further, if the size of a coil (inductor) which serves as a communication antenna of the power transmitting device 200 is the same or larger than the operating distance in the case of not performing impedance conversion, for example, attenuation of a magnetic field strength with respect to a distance decreases, so that an increase in operating distance becomes more significant.

As described in the foregoing, the power receiving device 250 according to the first embodiment of the present invention includes the impedance converting circuit 254 which converts impedance between the carrier receiving circuit 252 and the processing circuit 256. The carrier receiving circuit 252 includes the inductor L which is not equipped with an intermediate tap, and the impedance converting circuit 254 includes the capacitors C1 and C2 which are connected in series. The carrier receiving circuit 252 and the impedance converting circuit 254 constitute a resonance circuit. The power receiving device 250 performs impedance conversion by capacitive division of a received voltage which is output from the resonance circuit, so that electric power that can be consumed in the processing circuit 256 is larger compared with the case where impedance conversion is not performed. Accordingly, the power receiving device 250 can implement a function, which has not been implemented in batteryless configuration due to restriction of power consumption in a power receiving device of a related art that does not perform impedance conversion, in batteryless configuration. Further, the power receiving device 250 enables the operating distance to be longer than the operating distance in a power receiving device of a related art that does not perform impedance conversion, thereby stabilizing communication between the power transmitting device and the power receiving device, for example.

Furthermore, the power receiving device 250 can adjust impedance conversion by forming the impedance converting circuit 254 by capacitors having variable capacitance, for example. Therefore, the power receiving device 250 can adjust impedance matching between the carrier receiving circuit 252 and the processing circuit 256 by adjusting impedance conversion, so that impedance matching is not fixed to a particular case as in a power receiving device of a related art that performs impedance conversion using an intermediate tap or a coupling coil.

Further, because the inductor L which constitutes the carrier receiving circuit 252 is not equipped with an intermediate tap in the power receiving device 250, unlike a power receiving device of a related art that performs impedance conversion using an intermediate tap or a coupling coil, leads of an intermediate tap or placement of a coupling coil do not constitute a restriction on packaging.

(Power Receiving Device According to the Second Embodiment)

The power receiving device 250 according to the first embodiment described above performs impedance conversion by means of capacitive division in the impedance converting circuit. However, a method of impedance conversion according to embodiments of the present invention is not limited to the use of capacitive division. A power receiving device according to a second embodiment, which performs a different method of impedance conversion from the power receiving device 250 according to the first embodiment, is described hereinafter.

[Configuration Example of the Power Receiving Device 350]

Figure 8:
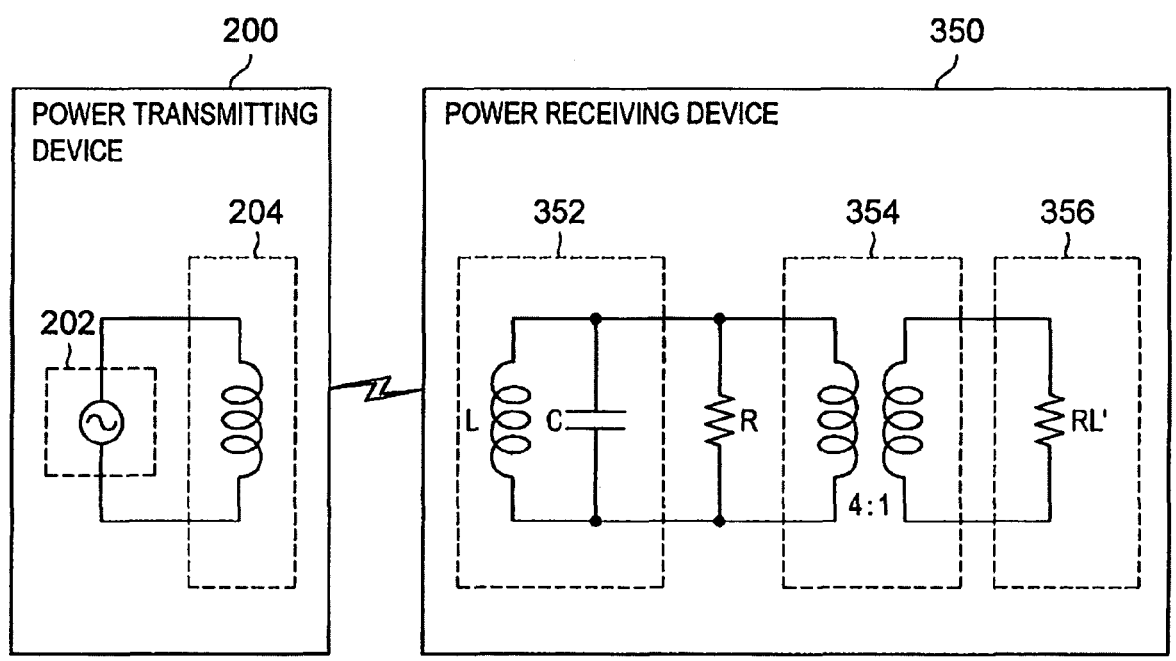
FIG. 8 is an explanatory view showing an equivalent circuit of a configuration example of a power receiving device according to a second embodiment of the present invention.

FIG. 8 is an explanatory view showing an equivalent circuit of a configuration example of the power receiving device 350 according to the second embodiment of the present invention. FIG. 8 also shows the power transmitting device 200 which transmits a carrier wave.

The power receiving device 350 includes a carrier receiving circuit 352, an impedance converting circuit 354 and a processing circuit 356, like the power receiving device 250 of the first embodiment. Referring to FIG. 8, the carrier receiving circuit 352, the impedance converting circuit 354 and the processing circuit 356 respectively have the following configurations.

(Carrier Receiving Circuit 352)

The carrier receiving circuit 352 is formed by a resonance circuit that is composed of an inductor L (communication antenna) having predetermined inductance which is not equipped with an intermediate tap and a capacitor having predetermined capacitance.

(Impedance Converting Circuit 354)

The impedance converting circuit 354 is formed by a transformer (e.g. primary side:secondary side=4:1).

(Processing Circuit 356)

The processing circuit 356 corresponds to the equivalent parallel resistor RL' (the same as that of FIG. 3B).

Figure 9:
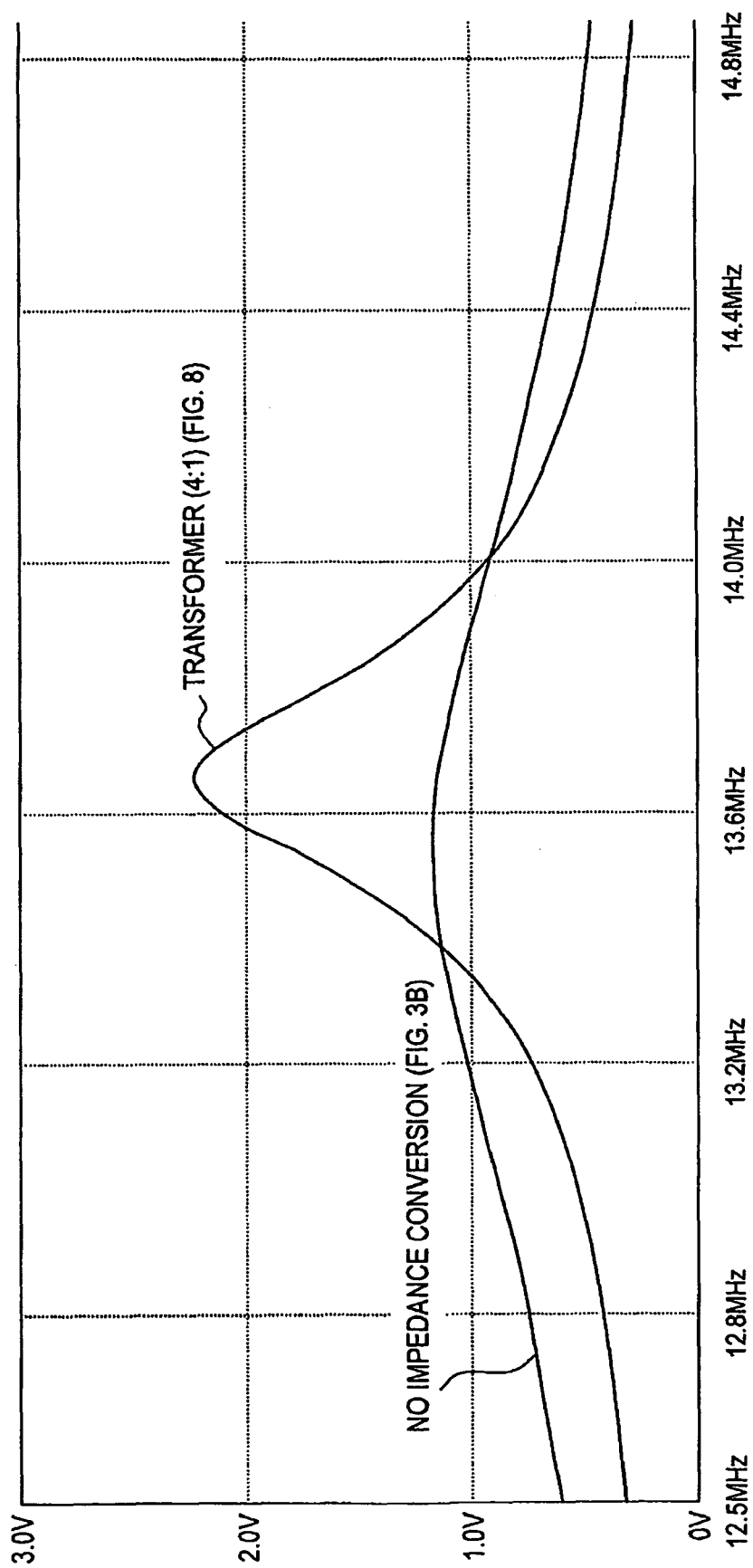
FIG. 9 is an explanatory view showing an example of a voltage generated in an equivalent load resistor RL' in the power receiving device according to the second embodiment of the present invention.

FIG. 9 is an explanatory view showing an example of a voltage which is generated in the equivalent parallel resistor RL' in the power receiving device 350 according to the second embodiment of the present invention. In FIG. 9, the vertical axis indicates a voltage which is generated in the equivalent load resistor RL' in the case where impedance conversion is not performed (FIG. 3B) and the case where impedance conversion is performed using a transformer with an impedance conversion ratio or 4:1 (FIG. 8), and the horizontal axis indicates a frequency of a carrier wave. FIG. 9 shows the case where the Q-value of the resonance circuit is 1000 and a ratio of the equivalent load resistor R and the equivalent load resistor RL' is 85, for example.

If the ratio of the equivalent load resistor R and the equivalent load resistor RL' is sufficiently higher than the impedance conversion ratio, a voltage which is generated in the equivalent parallel resistor RL' is approximately the square root of the impedance conversion ratio. Referring to FIG. 9, the ratio of peak values between the case not performing impedance conversion (FIG. 3B) and the case of performing impedance conversion by a transformer (FIG. 8) is approximate to the square root of the impedance conversion ratio. Because electric power which is consumed in the equivalent parallel resistor RL' is the square of a generated voltage, electric power transfer efficiency from the power transmitting device 200 to the power receiving device 350 is about 4 times that of a power receiving device of a related art that does not perform impedance conversion.

Further, if a voltage which is generated in the equivalent parallel resistor RL' doubles, for example, the operating distance in the power transfer system increases at least 1.26 (the cube root of 2) times longer compared with the case of not performing impedance conversion. Furthermore, if the size of a coil (inductor) which serves as a communication antenna of the power transmitting device 200 is the same or larger than the operating distance in the case of not performing impedance conversion, for example, attenuation of a magnetic field strength with respect to a distance decreases, so that an increase in operating distance becomes more significant.

Figure 10:
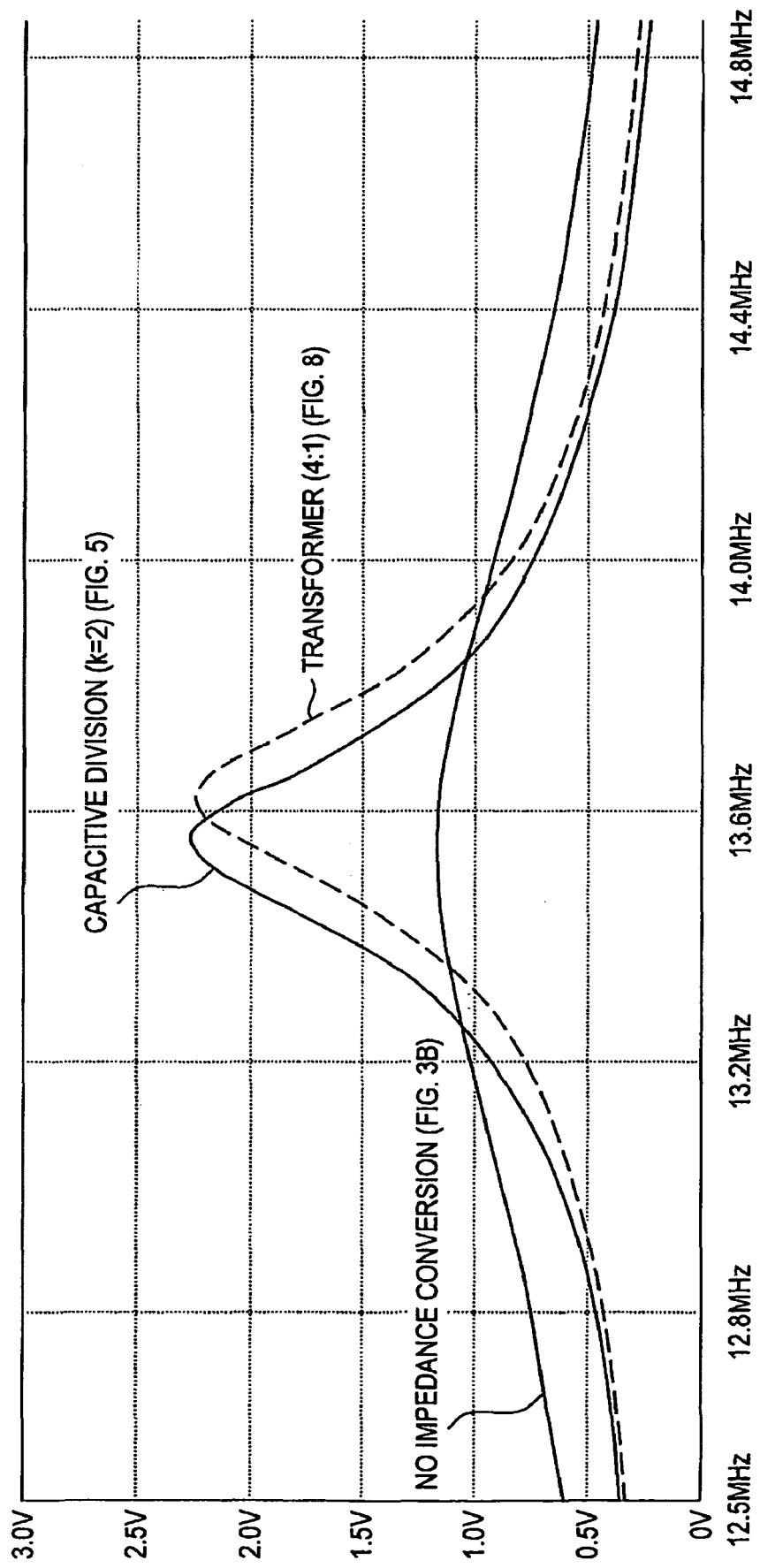
FIG. 10 is an explanatory view showing a voltage generated in the equivalent load resistor RL' in the power receiving device according to the first embodiment of the present invention and a voltage generated in the equivalent load resistor RL' in the power receiving device according to the second embodiment of the present invention in comparison with each other.

FIG. 10 is an explanatory view showing a voltage generated in the equivalent load resistor RL' in the power receiving device 250 according to the first embodiment and a voltage generated in the equivalent load resistor RL' in the power receiving device 350 according to the second embodiment in comparison with each other.

Referring to FIG. 10, in the power receiving device 250 according to the first embodiment which performs impedance conversion by capacitive division and the power receiving device 350 according to the second embodiment which performs impedance conversion by a transformer, the peak values of voltages which are generated in the equivalent load resistor RL' are substantially the same, although a slight deviation occurs in a resonance frequency. Therefore, the power receiving device 350 has the same advantages as the power receiving device 250 of the first embodiment, although a method of impedance conversion is different.

As described in the foregoing, the power receiving device 350 according to the second embodiment of the present invention includes the impedance converting circuit 354 which converts impedance between the carrier receiving circuit 352 and the processing circuit 356. The carrier receiving circuit 352 includes the inductor L which is not equipped with an intermediate tap and the capacitor C having predetermined capacitance, and they constitute a resonance circuit. The impedance converting circuit 354 is formed by a transformer. The power receiving device 350 performs impedance conversion of a received voltage which is output from the resonance circuit using the transformer, so that electric power that can be consumed in the processing circuit 356 is larger compared with the case of not performing impedance conversion. Accordingly, the power receiving device 350 can implement a function, which has not been implemented in batteryless configuration due to restriction of power consumption in a power receiving device of a related art that does not perform impedance conversion, in batteryless configuration. Further, the power receiving device 350 enables the operating distance to be longer than the operating distance in a power receiving device of a related art that does not perform impedance conversion, thereby stabilizing communication between the power transmitting device and the power receiving device, for example.

Further, a circuit constant in the transformer which constitutes the impedance converting circuit 354 of the power receiving device 350 can be selected from a large variation with the same size. This facilitates impedance conversion in accordance with the processing circuit 356 (i.e. the value of the equivalent load resistor RL').

Furthermore, in the power receiving device 350, the inductor L which constitutes the carrier receiving circuit 352 is not equipped with an intermediate tap unlike a power receiving device of a related art which performs impedance conversion using an intermediate tap or a coupling coil, so that leads of an intermediate tap or placement of a coupling coil do not constitute a restriction on packaging.

[Alternate Example of the Power Receiving Device According to the Second Embodiment]

Figure 11:
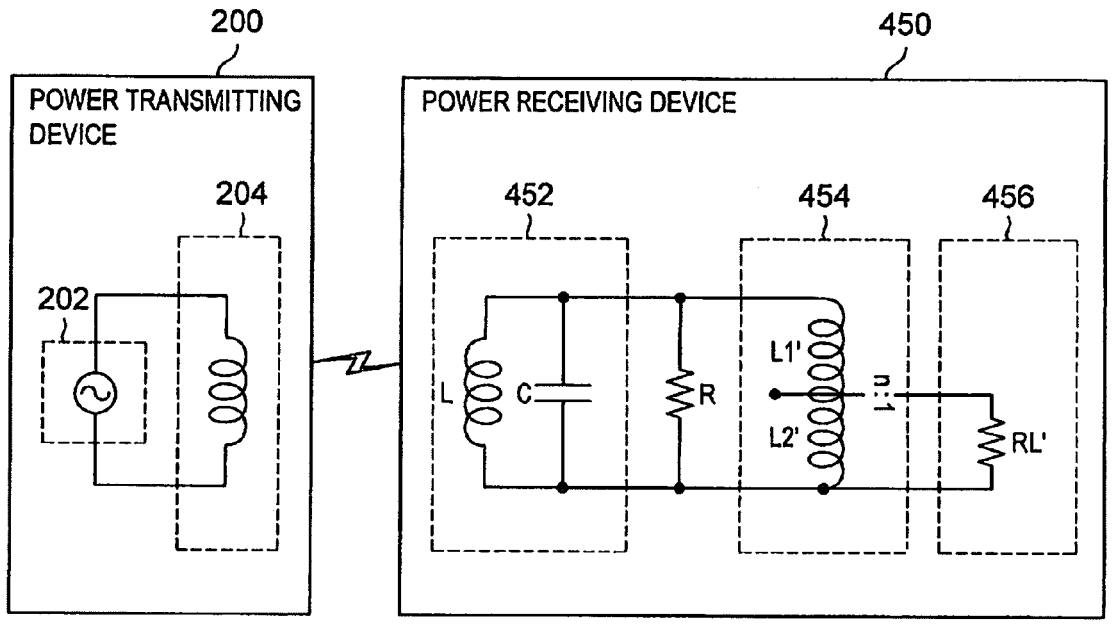
FIG. 11 is an explanatory view showing an equivalent circuit of a power receiving device according to an alternate example of the second embodiment of the present invention.

FIG. 11 is an explanatory view showing an equivalent circuit of a power receiving device 450 according to an alternative example of the second embodiment of the present invention. The power receiving device 450 includes a carrier receiving circuit 452, an impedance converting circuit 454 and a processing circuit 456, like the power receiving device 350.

The impedance converting circuit 454 shown in FIG. 11 is an equivalent circuit of the transformer of the impedance converting circuit 354 shown in FIG. 8, in which an inductor is equipped with a tap. If a ratio of the number of turns of the transformer shown in FIG. 8 is L1:L2=n:1, the tap is placed so as to satisfy the relationship of L2=L2' and L1=(1+n)2×L2', so that the impedance converting circuit 454 is equivalent to the impedance converting circuit 354, and impedance is n2:1.

Accordingly, the power receiving device according to the second embodiment does not necessarily have the configuration of the power receiving device 350 shown in FIG. 8, and impedance conversion can be performed in the configuration of the power receiving device 450 shown in FIG. 11, for example.

Third Embodiment

The power receiving device 250 of the first embodiment described above has the configuration that the impedance converting circuit performs capacitive division to thereby perform impedance conversion, and the power receiving device 350 of the second embodiment has the configuration that the impedance converting circuit performs impedance conversion using the transformer. A method of impedance conversion according to embodiments of the present invention, however, is not limited to the use of capacitive division or the transformer. A power receiving device according to a third embodiment, which performs a different method of impedance conversion from the power receiving devices according to the first and second embodiments, is described hereinafter.

First Configuration Example

Configuration Example of the Power Receiving Device 550

Figure 12:
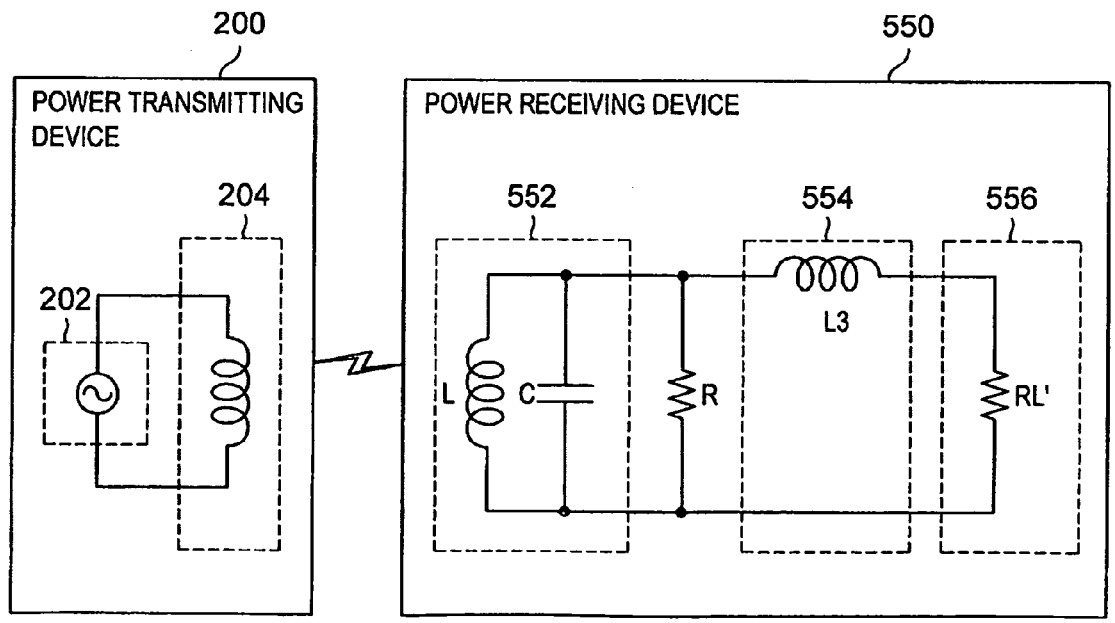
FIG. 12 is an explanatory view showing an equivalent circuit of a first configuration example of a power receiving device according to a third embodiment of the present invention.

FIG. 12 is an explanatory view showing an equivalent circuit of a first configuration example of a power receiving device according to a third embodiment of the present invention. FIG. 12 also shows the power transmitting device 200 which transmits a carrier wave.

A power receiving device 550 includes a carrier receiving circuit 552, an impedance converting circuit 554 and a processing circuit 556, like the power receiving device 250 of the first embodiment. Referring to FIG. 12, the carrier receiving circuit 552, the impedance converting circuit 554 and the processing circuit 556 respectively have the following configurations.

(Carrier Receiving Circuit 552)

The carrier receiving circuit 552 is formed by a resonance circuit that is composed of an inductor L (communication antenna) having predetermined inductance which is not equipped with an intermediate tap and a capacitor having predetermined capacitance.

(Impedance Converting Circuit 554)

The impedance converting circuit 554 is formed by an inductor which is connected in series with the equivalent load resistor RL'.

(Processing Circuit 556)

The processing circuit 556 corresponds to the equivalent parallel resistor RL' (the same as that of FIG. 3B).

The impedance converting circuit 554 performs impedance conversion by dividing a received voltage which is output from the resonance circuit using the inductor L3. The power receiving device 550 sets inductance L3 of the inductor L3 which constitutes the impedance converting circuit 554 to the value shown in the following expression 3, thereby dividing a received voltage output from the resonance circuit into 1/m (where m>1). m indicates a voltage dividing ratio and R' indicates resistance of the equivalent load resistor R' (FIG. 3C).

$$L3 = \sqrt{(m^2-1)} \cdot R'/\omega \quad \text{Expression 3}$$

The inductor L3 which constitutes the impedance converting circuit 554 is placed in the position that does not couple with the inductor L which constitutes the resonance circuit, and inductance of the inductor L3 is set to a value sufficiently larger than inductance of the inductor L which constitutes the resonance circuit, for example.

In the power receiving device 550 having the configuration shown in FIG. 12, the inductor L3 which constitutes the impedance converting circuit 554 can perform impedance conversion without being affected by resonance in the resonance circuit, and adjustment for obtaining a desired impedance conversion ratio can be made easily.

Second Configuration Example

Configuration Example of the Power Receiving Device 650

Figure 13:
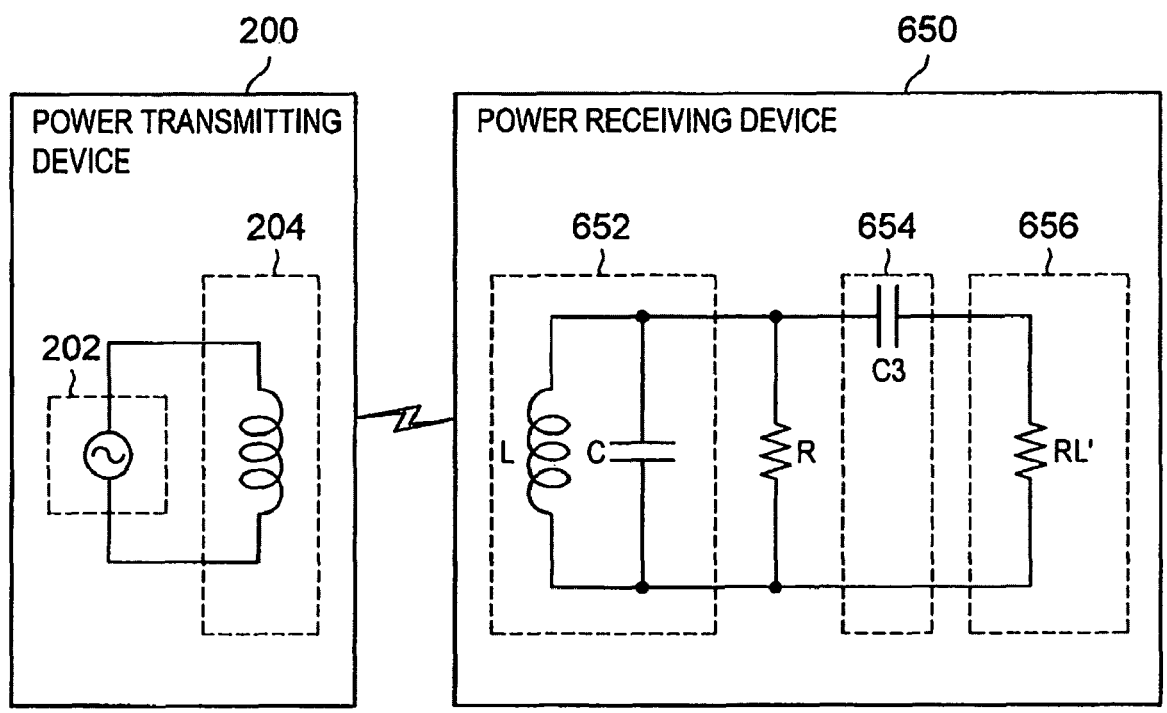
FIG. 13 is an explanatory view showing an equivalent circuit of a second configuration example of the power receiving device according to the third embodiment of the present invention.

Although the first configuration example of the power receiving device according to the third embodiment shown in FIG. 12 shows the case where the impedance converting circuit is formed by an inductor, the power receiving device according to the third embodiment is not limited thereto. FIG. 13 is an explanatory view showing an equivalent circuit of a second configuration example of the power receiving device according to the third embodiment of the present invention. FIG. 13 also shows the power transmitting device 200 which transmits a carrier wave.

A power receiving device 650 includes a carrier receiving circuit 652, an impedance converting circuit 654 and a processing circuit 656, like the power receiving device 550 of the first configuration example. Referring to FIG. 13, the carrier receiving circuit 652, the impedance converting circuit 654 and the processing circuit 656 respectively have the following configurations.

(Carrier Receiving Circuit 652)

The carrier receiving circuit 652 is formed by a resonance circuit that is composed of an inductor L (communication antenna) having predetermined inductance which is not equipped with an intermediate tap and a capacitor having predetermined capacitance.

(Impedance Converting Circuit 654)

The impedance converting circuit 654 is formed by a capacitor C3 which is connected in series with the equivalent load resistor RL'.

(Processing Circuit 656)

The processing circuit 656 corresponds to the equivalent parallel resistor RL' (the same as that of FIG. 3B).

The impedance converting circuit 654 performs impedance conversion by dividing a received voltage which is output from the resonance circuit using the capacitor C3. The power receiving device 650 sets capacitance C3 of the capacitor C3 which constitutes the impedance converting circuit 654 to the value shown in the following expression 4, thereby dividing a received voltage output from the resonance circuit into 1/m (where m>1). m indicates a voltage dividing ratio and R' indicates resistance of the equivalent load resistor R' (FIG. 3C).

$$C3 = 1/\sqrt{(m^2-1)} \cdot R' \cdot \omega \quad \text{Expression 4}$$

Capacitance of the capacitor C3 which constitutes the impedance converting circuit 654 is set to a value sufficiently smaller than capacitance of the capacitor C which constitutes the resonance circuit, for example. In the power receiving device 650 having the configuration shown in FIG. 13, the capacitor C3 which constitutes the impedance converting circuit 654 can perform impedance conversion without being affected by resonance in the resonance circuit, and adjustment for obtaining a desired impedance conversion ratio can be made easily.

Figure 14:
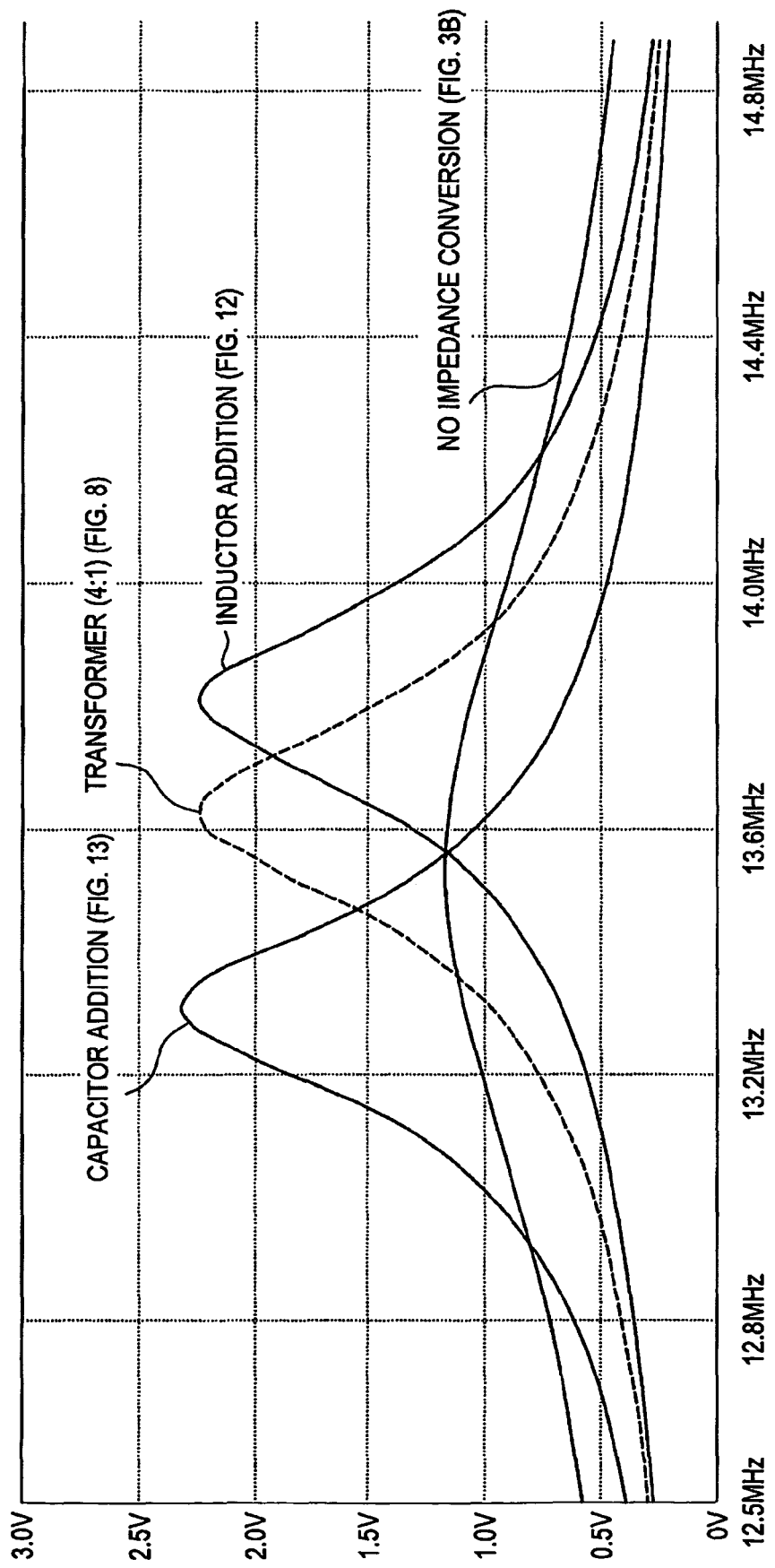
FIG. 14 is an explanatory view showing an example of a voltage generated in an equivalent load resistor RL' in the power receiving device according to the third embodiment of the present invention.

FIG. 14 is an explanatory view showing an example of a voltage generated in the equivalent load resistor RL' in the power receiving device according to the third embodiment of the present invention. In FIG. 14, the vertical axis indicates a voltage which is generated in the equivalent load resistor RL' in the case where impedance conversion is not performed (FIG. 3B), the case where impedance conversion is performed using a transformer (4:1) (FIG. 8), the case where impedance conversion is performed by dividing a voltage at 1/m(m=2) using an inductor (FIG. 12) and the case where impedance conversion is performed by dividing a voltage at 1/m(m=2) using a capacitor (FIG. 13), respectively, and the horizontal axis indicates a frequency of a carrier wave. FIG. 14 shows the case where the Q-value of the resonance circuit is 1000 and a ratio of the equivalent load resistor R and the equivalent load resistor RL' is 85, for example.

Referring to FIG. 14, peak values of voltages which are generated in the equivalent load resistor RL' are substantially the same among the cases of impedance conversion using a transformer (the power receiving device of the second embodiment), impedance conversion by adding an inductor (the first example of the power receiving device of the third embodiment), impedance conversion by adding a capacitor (the second example of the power receiving device of the third embodiment), although a slight deviation occurs in a resonance frequency. Therefore, the power receiving devices according to the third embodiment have the same advantages as the power receiving device 350 of the second embodiment, although a method of impedance conversion is different. A deviation in a resonance frequency as shown in FIG. 14 can be compensated by adjusting inductance of the inductor or capacitance of the capacitor which constitutes the resonance circuit (carrier receiving circuit 652), for example.

As described in the foregoing, the power receiving devices 550 and 650 according to the third embodiment of the present invention include the impedance converting circuit which converts impedance between the carrier receiving circuit and the processing circuit. The carrier receiving circuit includes the inductor L which is not equipped with an intermediate tap and the capacitor C having predetermined capacitance, which constitute a resonance circuit. The impedance converting circuit 554 of the power receiving device 550 is formed by an inductor and divides a received voltage output from the resonance circuit, and the impedance converting circuit 654 of the power receiving device 650 is formed by a capacitor and divides a received voltage output from the resonance circuit. The power receiving devices 550 and 650 perform impedance conversion by dividing a received voltage output from the resonance circuit using the inductor or the capacitor, respectively, so that electric power that can be consumed in the processing circuit is larger compared with the case where impedance conversion is not performed. Accordingly, the power receiving devices 550 and 650 can implement a function, which has not been implemented in batteryless configuration due to restriction of power consumption in a power receiving device of a related art that does not perform impedance conversion, in batteryless configuration. Further, the power receiving devices 550 and 650 enable the operating distance to be longer than the operating distance in a power receiving device of a related art that does not perform impedance conversion, thereby stabilizing communication between the power transmitting device and the power receiving device, for example.

Further, the power receiving devices 550 and 650 can adjust impedance conversion by forming the impedance converting circuit by an inductor having variable inductance or a capacitor having variable capacitance, for example. Therefore, the power receiving devices 550 and 650 can adjust impedance matching between the carrier receiving circuit and the processing circuit by adjusting impedance conversion, so that impedance matching is not fixed to a particular case as in a power receiving device of a related art that performs impedance conversion using an intermediate tap or a coupling coil.

Further, because the inductor L which constitutes the carrier receiving circuit is not equipped with an intermediate tap in the power receiving devices 550 and 650 unlike a power receiving device of a related art that performs impedance conversion using an intermediate tap or a coupling coil, leads of an intermediate tap or placement of a coupling coil do not constitute a restriction on packaging.

Although the power transmitting device 200 is used as an example of the element which constitutes the power transfer system according to embodiments of the present invention, embodiments of the present invention are not limited thereto. For example, they may be applied to a portable communication device such as a reader/writer and a cellular phone having a reader/writer function (i.e. a function to actively transmit a carrier wave), a computer having a reader/writer function such as ultra mobile personal computer (UMPC), and so on.

Further, although the power receiving devices 250, 350 and so on are used as an example of the element which constitutes the power transfer system according to embodiments of the present invention, embodiments of the present invention are not limited thereto. For example, they may be applied to a portable communication device such as an RFID tag, an IC card, a cellular phone equipped with an IC chip, a computer equipped with an IC chip such as a personal computer (PC), and so on.

It should be understood by those skilled in the art that various modifications, combinations, sub-combinations and alterations may occur depending on design requirements and other factors insofar as they are within the scope of the appended claims or the equivalents thereof.

For example, although the power receiving device 250 according to the first embodiment shown in FIG. 5 has the configuration that the impedance converting circuit includes two capacitors and performs capacitive division of a received voltage output from the resonance circuit, embodiments of the present invention are not limited thereto. For example, the power receiving device according to the first embodiment may have three capacitors as the impedance converting circuit to thereby perform capacitive division of a received voltage output from the resonance circuit.

The above-described configurations merely illustrate one example of embodiments of the present invention and are thus included within the scope of the present invention.

What is claimed is:

1. A power receiving device capable of receiving a carrier wave transmitted from a power transmitting device without contact and obtaining electric power from the received carrier wave, comprising:
   a carrier receiving section at least including a communication antenna having predetermined inductance and not equipped with an intermediate tap, to receive the carrier wave and generate an induced voltage corresponding to the carrier wave;
   a processing section to generate a drive voltage based on the induced voltage and perform data processing using the generated drive voltage; and
   an impedance converting section to convert impedance between the carrier receiving section and the processing section, wherein
   the impedance converting section includes a first capacitor and a second capacitor each having predetermined capacitance and connected in series with each other,
   the communication antenna, the first capacitor and the second capacitor constitute a resonance circuit, and
   the impedance converting section divides an induced voltage generated in the resonance circuit.

2. A power receiving device capable of receiving a carrier wave transmitted from a power transmitting device without contact and obtaining electric power from the received carrier wave, comprising:
   a carrier receiving section at least including a communication antenna having predetermined inductance and not equipped with an intermediate tap, to receive the carrier wave and generate an induced voltage corresponding to the carrier wave;
   a processing section to generate a drive voltage based on the induced voltage and perform data processing using the generated drive voltage; and
   an impedance converting section to convert impedance between the carrier receiving section and the processing section,
   wherein the carrier receiving section further includes a fifth capacitor having predetermined capacitance to constitute a resonance circuit, and
   the impedance converting section includes a sixth capacitor having predetermined capacitance and connected in series with the processing section and divides an induced voltage generated in the resonance circuit.

3. A power transfer system comprises a power transmitting device to transmit a carrier wave, and a power receiving device capable of receiving the carrier wave transmitted from the power transmitting device without contact and obtaining electric power from the received carrier wave,
   the power transmitting device including
   a carrier signal generating section to generate a carrier signal; and
   a carrier transmitting section to transmit a carrier wave corresponding to the carrier signal, and
   the power receiving device including
   a carrier receiving section at least including a communication antenna having predetermined inductance and not equipped with an intermediate tap, to receive the carrier wave and generate an induced voltage corresponding to the carrier wave;

a processing section to generate a drive voltage based on the induced voltage and perform data processing using the generated drive voltage; and an impedance converting section to convert impedance between the carrier receiving section and the processing section, wherein the impedance converting section includes a first capacitor and a second capacitor each having predetermined capacitance and connected in series with each other, the communication antenna, the first capacitor and the second capacitor constitute a resonance circuit, and the impedance converting section divides an induced voltage generated in the resonance circuit.

4. A power transfer system comprises a power transmitting device to transmit a carrier wave, and a power receiving device capable of receiving the carrier wave transmitted from the power transmitting device without contact and obtaining electric power from the received carrier wave, the power transmitting device including a carrier signal generating section to generate a carrier signal; and a carrier transmitting section to transmit a carrier wave corresponding to the carrier signal, and the power receiving device including a carrier receiving section at least including a communication antenna having predetermined inductance and not equipped with an intermediate tap, to receive the carrier wave and generate an induced voltage corresponding to the carrier wave;

a processing section to generate a drive voltage based on the induced voltage and perform data processing using the generated drive voltage; and an impedance converting section to convert impedance between the carrier receiving section and the processing section, wherein the carrier receiving section further includes a fifth capacitor having predetermined capacitance to constitute a resonance circuit, and the impedance converting section includes a sixth capacitor having predetermined capacitance and connected in series with the processing section and divides an induced voltage generated in the resonance circuit.

\* \* \* \* \*